United States Patent
Lammens et al.

(10) Patent No.: US 9,821,252 B2
(45) Date of Patent: Nov. 21, 2017

(54) FLUID SEPARATION SYSTEMS AND METHODS

(71) Applicant: ExxonMobil Chemical Patents Inc., Baytown, TX (US)

(72) Inventors: Henri A. Lammens, Antwerp (BE); Philip H. Cornelissen, Heverlee (BE); Paul J. Clymans, Kapelle-Op-Den-Bos (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/105,806

(22) PCT Filed: Dec. 16, 2014

(86) PCT No.: PCT/IB2014/003192
§ 371 (c)(1),
(2) Date: Jun. 17, 2016

(87) PCT Pub. No.: WO2015/114401
PCT Pub. Date: Aug. 6, 2015

(65) Prior Publication Data
US 2016/0332094 A1    Nov. 17, 2016

Related U.S. Application Data

(60) Provisional application No. 61/934,075, filed on Jan. 31, 2014.

(30) Foreign Application Priority Data

Apr. 8, 2014  (EP) .................................... 14163817

(51) Int. Cl.
| | | |
|---|---|---|
| *C08G 64/00* | (2006.01) | |
| *B01D 21/26* | (2006.01) | |
| *B01D 45/12* | (2006.01) | |
| *B01J 8/00* | (2006.01) | |
| *B01J 19/24* | (2006.01) | |
| *B04C 5/04* | (2006.01) | |
| *B04C 5/12* | (2006.01) | |
| *B04C 5/20* | (2006.01) | |
| *B04C 9/00* | (2006.01) | |
| *C08F 110/02* | (2006.01) | |
| *C08G 63/02* | (2006.01) | |

(52) U.S. Cl.
CPC ........... *B01D 21/267* (2013.01); *B01D 45/12* (2013.01); *B01J 8/0055* (2013.01); *B01J 19/2415* (2013.01); *B04C 5/04* (2013.01); *B04C 5/12* (2013.01); *B04C 5/20* (2013.01); *B04C 9/00* (2013.01); *C08F 110/02* (2013.01); *B01J 2219/24* (2013.01); *B04C 2009/008* (2013.01)

(58) Field of Classification Search
CPC ........................................................ C08F 2/34
USPC ............................... 526/61, 68, 348.2, 348.5
See application file for complete search history.

(56) References Cited

U.S. PATENT DOCUMENTS

| | | |
|---|---|---|
| 4,115,638 A | 9/1978 | Becker et al. |
| 4,804,725 A | 2/1989 | Kanne et al. |
| 6,472,482 B1 | 10/2002 | Evertz et al. |
| 2012/0275961 A1 | 11/2012 | Morgan et al. |

*Primary Examiner* — Terressa Boykin
(74) *Attorney, Agent, or Firm* — Luke A. Parsons; Leandro Arechederra, III (57) ABSTRACT

A system including a vessel with at least two fluid inlets and a fluid outlet wherein one fluid inlet is positioned higher in the vessel than the other fluid inlet is provided. The fluid inlets may be connected to a polymerization reactor and each fluid inlet may be configured to deliver fluid to the vessel from a different zone of the polymerization reactor. During shut-down of a polymerization reactor, reaction mixture is discharged to a separation system where polymer particles are removed from the mixture prior to being released into the atmosphere.

25 Claims, 8 Drawing Sheets

FLUID SEPARATION SYSTEMS AND METHODS

CROSS REFERENCE TO RELATED APPLICATIONS

This application is a National Stage Application of International Application No. PCT/IB2014/003192, filed Dec. 16, 2014, which claims the benefit of Ser. No. 61/934,075, filed Jan. 31, 2014, the disclosures of which are incorporated by reference in their entireties.

FIELD OF THE INVENTION

This disclosure relates to fluid separation systems and methods. More particularly, this invention relates to systems and methods for separating polymer particles from reaction mixtures in polymerization processes.

BACKGROUND OF THE INVENTION

Polymerization reactors convert relatively low cost olefin monomers (e.g., ethylene, optionally in combination with one or more comonomers) into valuable polyolefin product (e.g., polyethylene).

It is well-known that the economics of polymer productions, including polyethylene production, strongly favor operating at a large scale and therefore, there has been a long standing desire to develop reactors of high capacity. However, the operation of large polymerization reactors, including tubular reactors, require special considerations. The reactors are generally operated at high pressure (e.g., 200 to 310 MPa) and high temperature (e.g., 150 to 450° C.). The polymerization reaction is highly exothermic. If the reaction mixture overheats, the olefins will decompose into carbon, hydrogen, and methane. Moreover, excessive temperature and/or pressure can present safety concerns. For these reasons, it is important to conduct the polymerization in a controlled manner and, if necessary, implement emergency shut-down of the reactor.

Emergency shut-down generally requires rapidly relieving the temperature and pressure conditions within the reactor by venting the reactor contents (e.g., a mixture of unreacted components and polymer particles) into the atmosphere. Separations systems, sometimes referred to as Emergency Vent Separators ("EVSs"), such as that disclosed in U.S. Patent Publication No. 2012/0275961, may be used to reduce the emission of polymer particles into the atmosphere during reactor shut-down.

Another EVS known in the art, designed by BASF, incorporates a vessel containing a liquid with multiple tangential inlets connected to various areas of a reactor. See, for example, U.S. Pat. Nos. 4,115,638 and 4,804,725. However, large reactors, including tubular reactors being manufactured today over 3.0 $m^3$ volume or over 250 kta capacity present new problems related to the large mass flux of reactor effluent that must be rapidly vented from the reactor. EVSs such as that described above may not be well-suited to accommodate the massive forces and vibrations associated with such reactor size.

Other background references include EP 1 142 916 A.

An EVS for large reactors must sustain massive forces and vibrations while safely and cleanly managing large mass flux fluid flows of hot, potentially flammable reactor effluent during emergency shut-down. The demands placed on EVS equipment increase as the scale of operation is increased. Therefore, it would be desirable to have a system and method to safely and effectively separate particles from a high mass flux fluid flow during reactor shutdown.

SUMMARY OF THE INVENTION

The present invention provides systems and processes for separating particles from fluids originating from high pressure reactors, including reactors having a volume over 3.0 $m^3$ or capacity over 250 kta. The invention allows the rapid introduction of fluid into a vessel where solid polymer particles may be separated from the fluid before it exits the system. In particular, the invention limits and sustains large forces and vibrations created by separating the large mass flux of fluid through multiple fluid inlets as part of a system that avoids interaction between supersonic flows and promotes less turbulent flow within the vessel and through a fluid outlet.

In one aspect, this disclosure relates to systems for separating particles from a fluid from a tubular polymerization reactor having a volume over 3.0 $m^3$ or capacity over 250 kta. In addition to the reactor, the system comprises a separation vessel having an inner surface, at least two fluid inlets including a first fluid inlet and a second fluid inlet, a fluid outlet, and a reservoir configured to contain a liquid at a variable level. The first fluid inlet is positioned higher in the vessel than the second fluid inlet while the second fluid inlet is positioned higher in the vessel than the level of liquid contained in the reservoir.

In another aspect, this disclosure relates to polymerization systems. The system may comprise a tubular polymerization reactor having a volume over 3.0 $m^3$ or capacity over 250 kta operable at about 120 to about 310 MPa and about 225 to about 375° C., and a separation system. In addition to the reactor, the separation system comprises a vessel having at least two fluid inlets including a first fluid inlet and a second fluid inlet, a fluid outlet, and a reservoir configured to contain a liquid at a variable level. The first fluid inlet is positioned higher in the vessel than the second fluid inlet while the second fluid inlet is positioned higher in the vessel than the level of liquid contained in the reservoir. The fluid inlets are connected to the polymerization reactor and each fluid inlet may be configured to deliver fluid to the vessel from a different zone of the polymerization reactor.

The polymerization system may alternatively comprise an autoclave reactor and a separation system. Fluid flow from the autoclave reactor to the separation system may be controlled by valves, automatic pressure relief devices or a combination of both working in concert or as redundant safety systems.

In another aspect, this disclosure relates to methods for separating particles from a reaction mixture during shut-down of a polymerization reactor having a volume over 3.0 $m^3$ or capacity over 250 kta. The method comprises (i) letting down the polymerization reactor by opening one or more valves; and (ii) discharging at least a portion of the reaction mixture from the polymerization reactor to a separation system. The separation system comprises a vessel having at least two fluid inlets including a first fluid inlet and a second fluid inlet, a fluid outlet, and a reservoir configured to contain a liquid at a variable level. The first fluid inlet is positioned higher in the vessel than the second fluid inlet while the second fluid inlet is positioned higher in the vessel than the level of liquid contained in the reservoir.

These and other features, aspects, and advantages of the present disclosure will become better understood with regard to the following description and appended claims.

DETAILED DESCRIPTION OF THE INVENTION

Described herein are systems and methods for separating particles (e.g., solid polymer) from fluids, particularly during shut-down of polymerization reactors. Various specific aspects of the invention will now be described, including definitions that are adopted herein for purposes of understanding the claimed invention. While the following detailed description illustrates specific aspects, those skilled in the art will appreciate that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

Figure 1A:
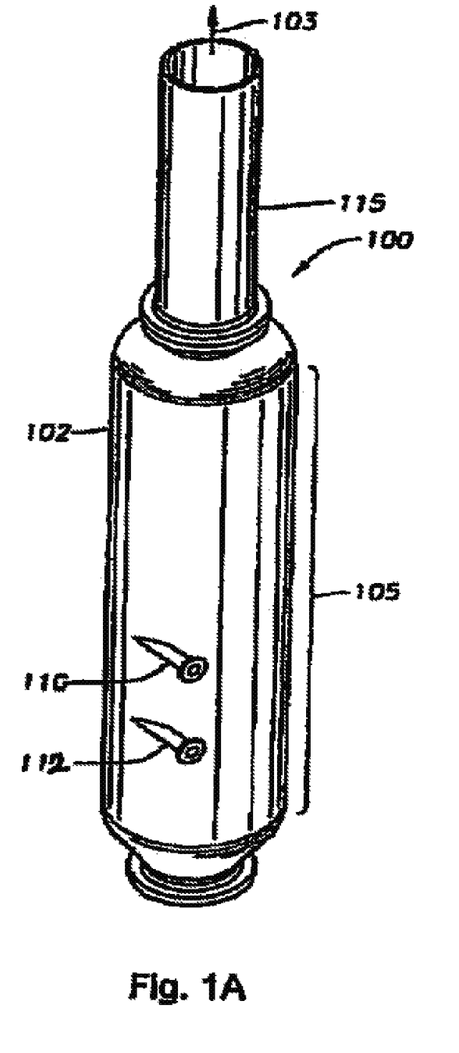
FIGS. 1A-1B illustrates a separation system.
Figure 1B:
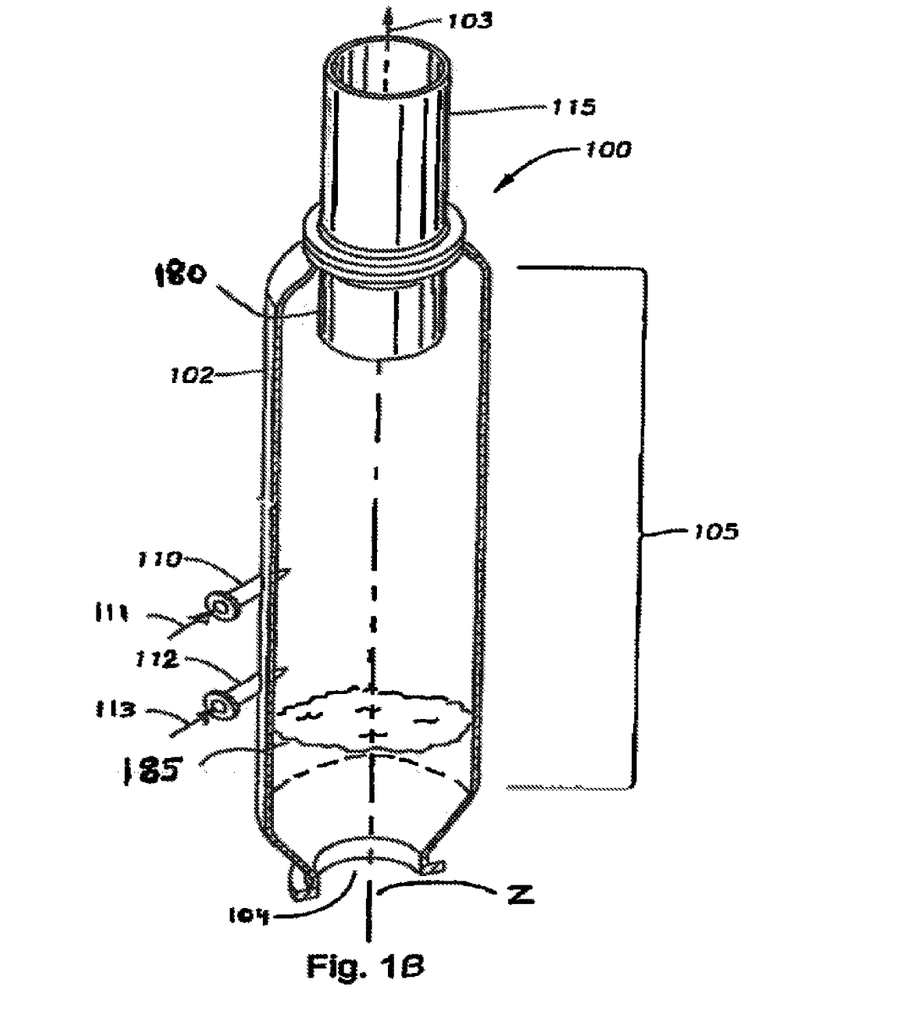

FIGS. 1A-1D illustrates aspects of a separation system. Separation system 100 includes vessel 105, which may be any structure sufficient to contain fluid within. As shown, vessel 105 is cylindrical. However, vessel 105 may be any cross-sectional shape, e.g., rectangular, circular and/or the like. Moreover, vessel 105 may be any size sufficient to accommodate the flow of fluid discharged from a reactor system during shut-down, for example, the volume of the vessel may be 10-15 m$^3$. In FIGS. 1A-1B, vessel 105 is substantially vertically oriented and defined by central vertical axis Z. In other embodiments, vessel 105 may be substantially horizontally oriented or in another orientation. Vessel 105 may be made of any suitable material, such as steel.

Vessel 105 includes fluid inlets 110, 112. Two fluid inlets are shown; however separation system 100 may include any number of fluid inlets greater than one and sufficient to deliver fluid into vessel 105. Fluid inlets 110, 112 penetrate surface 102 of vessel 105. Fluid inlets 110, 112 are preferably defined on surface 102, but may also be configured to extend within vessel 105. Fluid inlets 110, 112 may introduce fluid into vessel 105 at a desired trajectory. Preferably, fluid inlets 110, 112 introduce fluid substantially tangentially to surface 102 of vessel 105. Additionally, fluid inlets 110, 112 are preferably configured so that neither fluid inlet's respective flow is directed counter to the direction of the other fluid inlet. For example, in FIGS. 1A-1D, the fluid inlets 110, 112 introduce fluid into vessel 105 in the same tangential direction about central vertical axis Z. However, fluid inlets 110, 112 may alternatively be configured to introduce fluid at any other desired angle, including perpendicularly away from or toward surface 102.

Fluid inlets 110, 112 may be configured to introduce fluid originating from a polymerization reactor, for example, a tubular reactor having a volume over 3.0 m$^3$ or capacity over 250 kta into vessel 105 upon the onset of an emergency shut-down of the reactor. At the onset of an emergency shut-down, fluid flows from the reactor through fluid inlets 110, 112. The flow increases rapidly to a maximum mass flux within, for example, 5 seconds, and more particularly within 1 second. Depending on the size and operating conditions of the reactor, the mass flux may vary greatly, for example between 0 kg/s and 1000 kg/s and more specifically up to a maximum of about 900 kg/s.

The total fluid mass flux is split between fluid inlets 110, 112. The fluid mass flux through the fluid inlets may be equal or different. In one aspect of the invention, the mass flux of fluid through upper fluid inlet 110 is greater than the mass flux through lower fluid inlet 112.

All fluid inlets are positioned at different elevations within vessel 105. For example, upper fluid inlet 110 is positioned higher in vessel 105 than lower fluid inlet 112. Upper fluid inlet 110 may be directly above lower fluid inlet 112, as shown in FIGS. 1A-1D. Alternatively, upper fluid inlet 110 may be positioned in a different radial position from lower fluid inlet 112 around central vertical axis Z. For example, one fluid inlet may be positioned 180 degrees about central vertical axis Z from another fluid inlet, as shown in FIGS. 2A-2B.

Figure 2A:
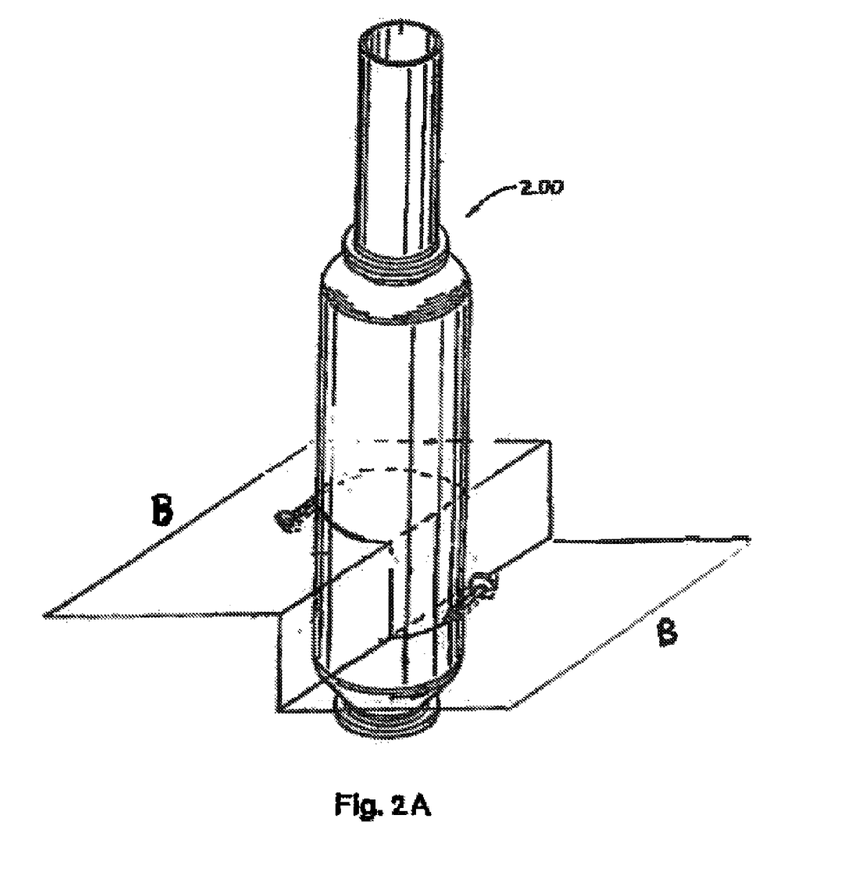
FIG. 2A illustrates a separation system in which fluid inlets are positioned radially opposite a central vertical axis.
Figure 2B:
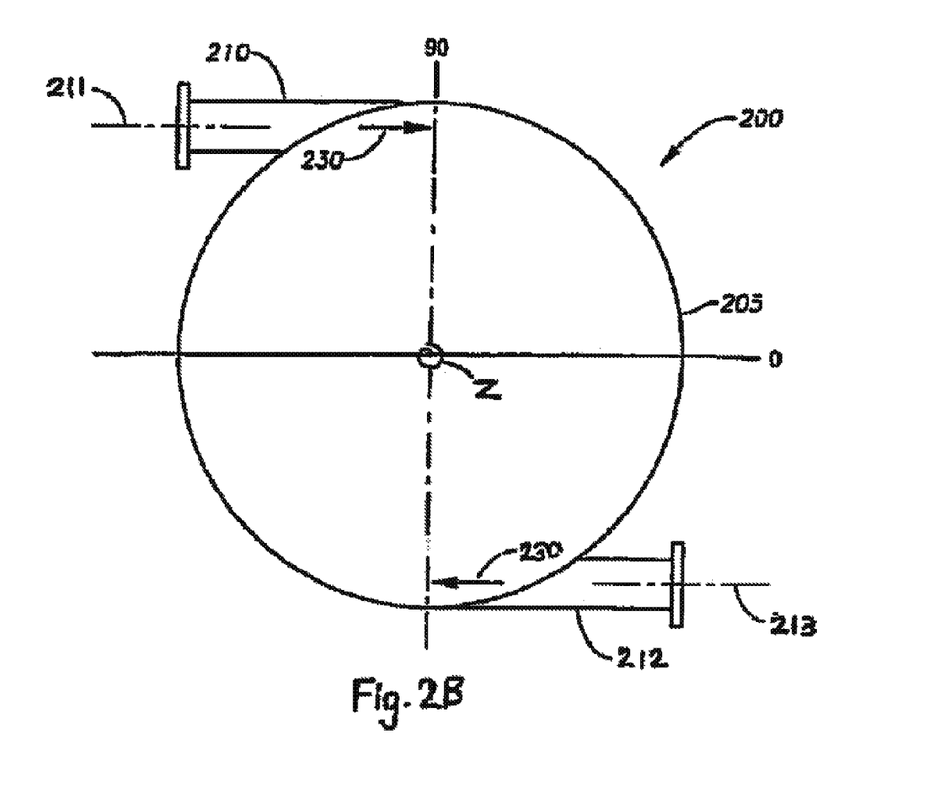
FIG. 2B illustrates a top view of cross-plane BB from FIG. 2A.

In a separation system 200 shown in FIGS. 2A-2B, upper fluid inlet 210 is positioned above and 180 degrees around vessel 205 from lower fluid inlet 212. Upper fluid stream 211 is introduced through upper fluid inlet 210 while lower fluid stream 213 is introduced through lower fluid inlet 212. Both fluid streams 211 and 213 are directed in the same tangential direction 230 around central vertical axis Z.

Figure 1C:
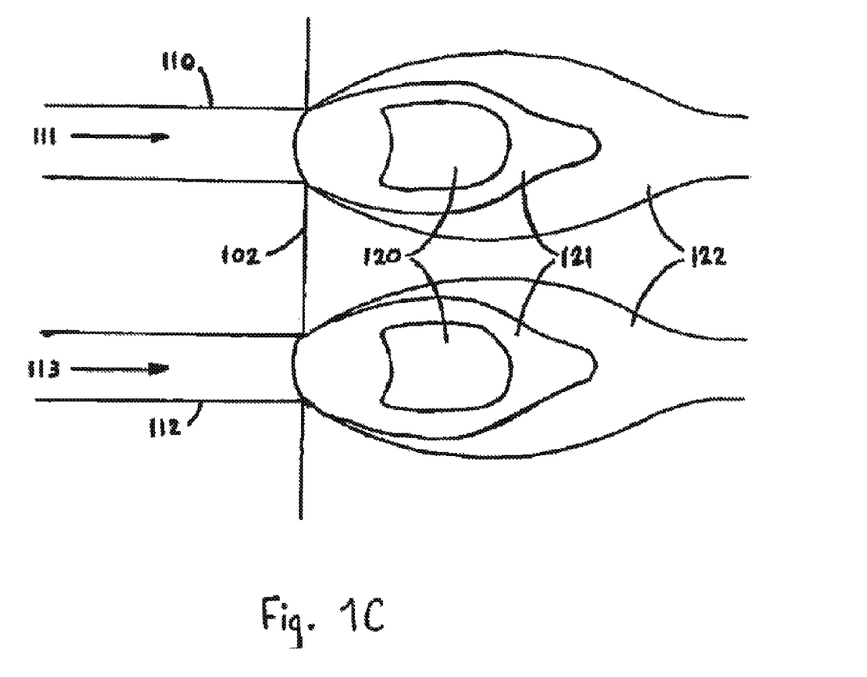
FIG. 1C illustrates fluid flow characteristics in a vertical plane through fluid inlets according to an aspect of a separation system.
Figure 1D:
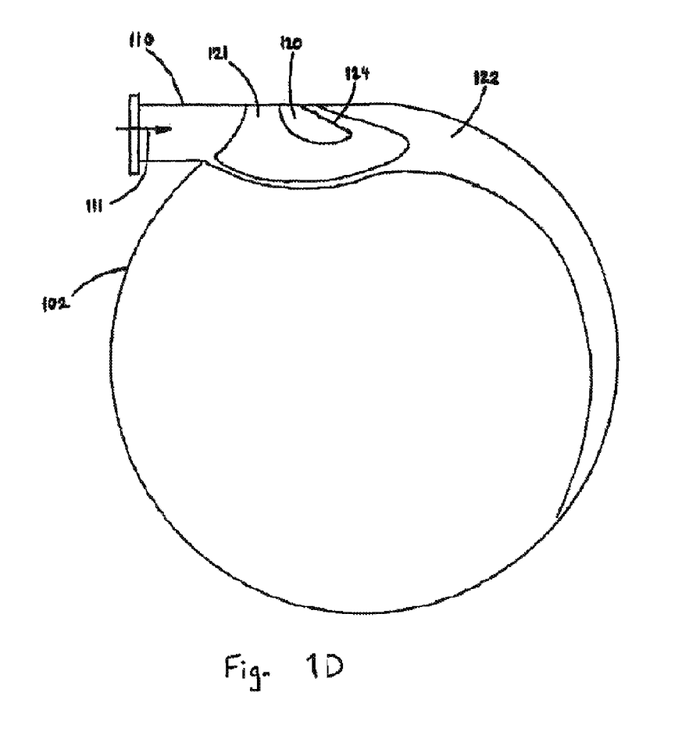
FIG. 1D illustrates fluid flow characteristics in a horizontal plane through a fluid inlet according to an aspect of a separation system.

FIGS. 1C and 1D illustrate characteristics of fluid flow through fluid inlets 110, 112 during peak or near peak mass flux conditions. As the fluid flow increases toward peak mass flux, fluid streams 111, 113 may experience sonic conditions before reaching fluid inlets 110, 112 and may expand upon entering vessel 105 at surface 102. Expanding fluid jets may form in these areas, marked by regions of supersonic flow 120 where M (Mach number) is much greater than 1, supersonic flow 121 where M is greater than 1, and sonic flow 122 where M≈1. As the fluid streams 111, 113 interact with surface 102, an oblique shock 124 may form, as shown in FIG. 1D. The distance between fluid inlets 110 and 112 is sufficient that the expanding fluid jet from each fluid inlet does not interfere with the other, as shown in FIG. 1C. For example, if fluid inlets 110, 112 have the same internal diameter, $D_I$, the vertical distance between fluid inlets 110 and 112 may be a distance of at least $1.5*D_I$ in order to avoid jet interaction. For another example, if fluid inlets 110, 112 have different internal diameters $D_1$ and $D_2$ respectively, then the vertical distance between fluid inlets 110 and 112 may be a distance of at least $1.5*(D_1+D_2)/2$ in order to avoid jet interaction.

The fluid may be any composition containing particles, whether in solid, gas, or aqueous form. For example, the fluid may comprise any known or hereinafter devised polymerization reaction components in the gas phase (e.g., one or more of olefin monomers such as ethylene-derived units or propylene-derived units, comonomers such as a-olefins, solvents, initiators, catalysts, additives, hydrogen, and/or the like) in combination with one or more particles (e.g., polymers such as those containing ethylene-derived units or propylene-derived units) suspended therein (e.g., a polyolefin, such as polyethylene or polypropylene).

Separation system 100 further includes a reservoir within vessel 105 containing a coolant 185. As shown in FIG. 1B, the bottom of vessel 105 may comprise opening 104 or one or more nozzles that may be located on the side of the vessel to permit entry or exit of coolant 185. Coolant 185 is a liquid, preferably water, and may be relatively cool compared to the fluid (e.g., about 5° C. to about 40° C.). Coolant 185 serves multiple useful purposes. First, after the fluid is introduced to vessel 105, coolant 185 serves to quench the fluid upon contact, causing solid polymer particles to precipitate out from the fluid. Second, the high momentum jets of fluid entering vessel 105 pulverize a portion of coolant 185, forming fine droplets that mix with the fluid as it swirls in vessel 105. These fine droplets of coolant 185 suppress the build-up of static electricity in the exiting fluid/coolant mixture 103 as it exits vessel 105 through fluid outlet 115, thus helping prevent a fire hazard. Coolant 185 may be filled to a desired level, as long as the level is maintained below lower fluid inlet 112. The coolant level may be maintained and monitored using appropriate level devices via nozzles inside of vessel 105. Coolant 185 may be drained from the vessel and/or may undergo further processing to remove the particles. The reservoir may be recharged with additional coolant.

Vessel 105 includes a fluid outlet 115 sufficient to discharge the fluid/coolant mixture from the vessel. Fluid outlet 115 is preferably be located at the top of vessel 105 concentric with central vertical axis Z to facilitate substantially vertical fluid discharge. Fluid outlet 115 may also comprise a vertical stack that guides the discharged fluid/coolant into the atmosphere.

The internal diameters of fluid inlets 110, 112 and fluid outlet 115 may be sized to control the speed and/or pressure of entry and/or exit of the fluid. For example, the internal diameter of the fluid inlets may be relatively small (e.g., about 0.04 to about 0.3 m) and/or the internal diameter of the fluid outlet may be relatively large (e.g., about 0.5 to about 1.5 m). Increasing the fluid outlet internal diameter proportionally decreases the average pressure within the vessel according to the following relationship:

$$P_V = M_0 * (1+\xi) * e^{-t/\tau} * c/(0.73 * A_{OUTLET});$$

where $P_V$ is the average vessel pressure; $M_0$ is the initial mass flow rate; $\xi$ is the steam mass fraction; t is time; $\tau$ is the inlet mass flow rate decay time; c is the speed of sound of the fluid/coolant mixture; and $A_{OUTLET}$ is the area of fluid outlet 115, calculated as $\pi * D_O^2/4$ where $D_O$ is the internal diameter of fluid outlet 115 in the instance that the fluid outlet is circular.

For example, by increasing the internal diameter of fluid inlet 115 from 0.91 m³ to 1.1 m³, average maximum wall pressures experienced in vessel 105 decrease from about 6.4 bar to 4.5 bar with all other variables remaining equal.

Furthermore, average internal surface pressure within the vessel is related to average pressure within the vessel according to the following relationship:

$$P_{VS} = P_V + \frac{1}{2} * S_W * \rho * c^2;$$

where $P_{VS}$ is the average internal surface pressure in the vessel; $S_W$ is a Swirl Factor; and $\rho$ is the fluid density within the vessel. The Swirl Factor is a fitting coefficient based on empirical evidence and is affected by the specific arrangement of fluid inlets 110, 112 and fluid outlet 115.

Thus the internal diameter of fluid outlet 115 has a compound effect on internal surface pressure, which determines the dynamic forces and moments acting on vessel 105. Hence, in one aspect of the invention, the minimum diameter of fluid outlet 115 may be determined based on the maximum internal surface pressure limits of the vessel which may be based on other design requirements.

Separation system 100 may further include barrier 180 to prevent fluid from prematurely exiting the system. As fluid swirls in vessel 105 and rises toward fluid outlet 115, barrier 180 forces the fluid downward to prevent premature exit of fluid and promote further separation of particles.

In operation, and with reference to FIG. 1B, fluid streams 111 and 113 enter separation system 100 through fluid inlets 110 and 112 respectively at an angle substantially tangential to wall 102 of vessel 105. The fluid streams immediately begin to swirl inside vessel 105, creating a vortex. The high momentum fluid flow interacts with coolant 185, pulverizing a portion of the coolant into fine droplets and causing the liquid mass to swirl. The atomized coolant suppresses build-up of static charge, lowers the temperature of the fluid/coolant mixture, and prevents potential ignition of the fluid. Particles present in the fluid separate out of the swirling fluid mixture due to inertia, i.e., "centrifugal forces" before the fluid/coolant mixture escapes through fluid outlet 115. As the let-down of the reactor is completed, the particles settle to the bottom of vessel 105 with any remaining fluid/coolant mixture. This mixture can later be removed from vessel 105 through opening 104 or by other means for disposal or additional processing.

By introducing fluid into the separation system through multiple fluid inlets according to the presently-described inventive arrangement, excessive internal surface pressures and vibrations are limited in several ways including, but not limited to, the following: First, by introducing the reactor fluid through multiple fluid inlets as opposed to one fluid inlet, direct impingement of the fluid expansion jets on surface 102 directly downstream of fluid inlets 110, 112 is spread among multiple areas, thereby lowering the localized pressures experienced at each site. Second, by spacing fluid inlets 110, 112 sufficiently apart from each other along the Z axis, the expansion jets associated with the fluid inlets do not interact directly, leading to a mostly subsonic swirling flow within vessel 105, as opposed to a supersonic swirling flow, thereby lowering internal surface pressures throughout vessel 105 and fluid outlet 115. Third, by delivering a higher mass flux of fluid through upper fluid inlet 110 than through lower fluid inlet 112, the amount of high momentum fluid impacting reservoir liquid 185 may be limited, thereby lessening the amount of fluid and liquid lost through fluid outlet 115 before a substantial amount of particles have been removed by swirling.

One or more separation systems may be employed in parallel or in series to further control and reduce the amount of polymer released into the atmosphere.

The invention also relates to a polymerization system including a reactor and separation system. The reactor may be a high pressure polymerization reactor, for example, a tubular, autoclave or slurry loop reactor, or combination thereof.

Figure 3:
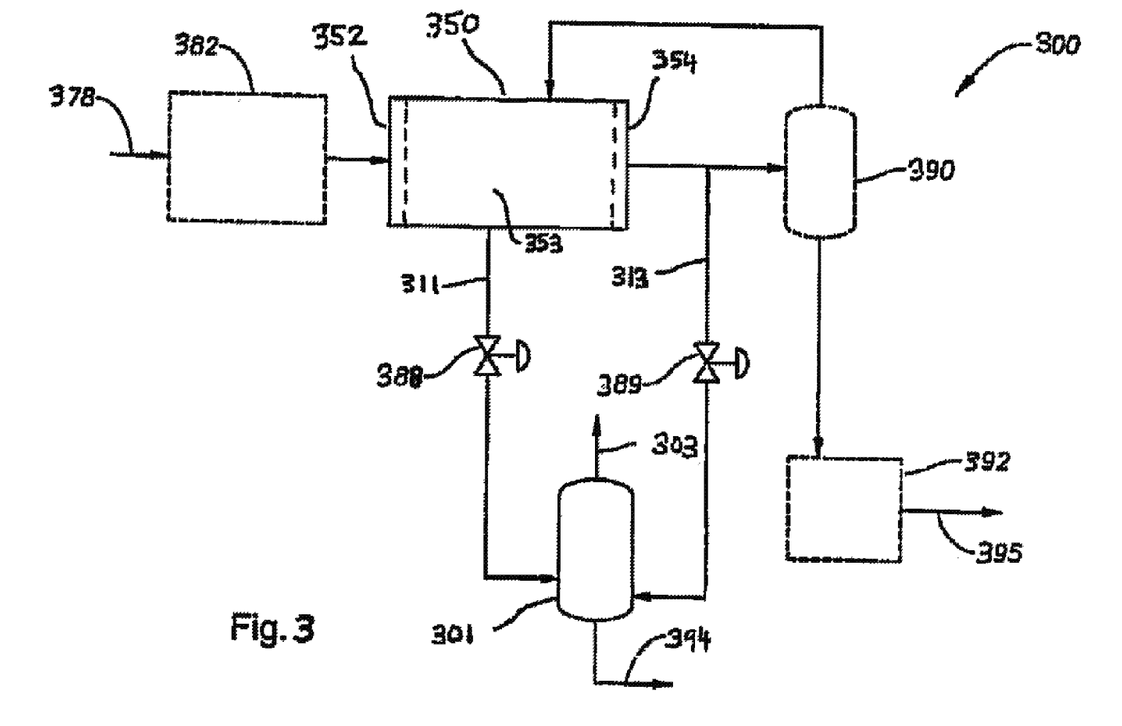
FIG. 3 schematically illustrates a polymerization system comprising a tubular reactor and a separation system.

For example, as shown in FIG. 3, polymerization system 300 includes separation system 301 and reactor 350. Reactor 350 may be a tubular reactor with multiple zones including an upstream end 352, a downstream end 354, and a midstream zone 353 between the upstream and downstream ends. The polymerization system 300 may further include any number of additional components to facilitate the polymerization process (e.g., compressors 382, separators 390, and dryers 392).

In operation, and with continued reference to FIG. 3, feed stream 378 comprising an olefin monomer along with component(s) needed for polymerization, e.g., initiators, catalysts and/or the like, and optionally, one or more components that are polymerizable therewith, e.g., a comonomer, is supplied directly or via optional compressor 382 to upstream end 352 of reactor 350. The olefin monomer may be ethylene or propylene, for example. Possible initiators include but are not limited to peroxides. Suitable catalysts include, but are not limited to, Ziegler/Natta catalysts or other single site catalysts. Feed stream 378 enters reactor 350 to form polymer 395 (e.g., polyethylene or polypropylene) which exits reactor 350 at downstream end 354. Reactor 350 may have a volume over 3.0 $m^3$ or capacity over 250 kta and operate at a pressure of about 120 to about 310 MPa, or about 200 to 250 MPa and at a temperature of about 225 to about 375° C., or about 250 to 350° C.

In the event reactor 350 needs to be shut down, e.g., it exceeds a predetermined pressure or temperature, feed stream 378 may be stopped and the pressure within reactor 350 be let down by opening two or more valves 388, 389 which transfer reaction mixture comprising a mixture of gas and polymer particles in fluid streams 311 and 313 to separation system 301. As used herein, opening valves includes manual opening as well as automatic actuation and the like.

Fluid stream 311 may originate from a specific zone of reactor 350, for example, the midstream zone. Fluid stream 313 may originate from a different zone of reactor 350 than fluid stream 311, for example downstream end 354. By having multiple valves and fluid streams exiting from different zones of the reactor, the reactor may be let down quicker and emergency shut-down be accomplished safely. Reactor 350, particularly as a tubular reactor, may have a pressure step-down gradient from upstream end 352 to downstream end 354. The midstream zone may therefore be more highly pressurized than downstream end 354 causing a higher mass flux through fluid stream 311 than through fluid stream 313.

Fluid stream 311 may be delivered to separation system 301 through an upper fluid inlet while fluid stream 313 may be delivered to separation system 301 through a lower fluid inlet. Based on the origin reactor zone of fluid stream 311 and 313, the mass flux through the upper fluid inlet may be higher than the mass flux through the lower fluid inlet. Upon introduction into separation system 301, the reaction mixture swirls in the separation system vessel, combining with a separation system liquid contained in the vessel which separates the polymer particles out before releasing fluid 303 into the atmosphere. Residual polymer 394 can then be removed from separation system 301.

Figure 4:
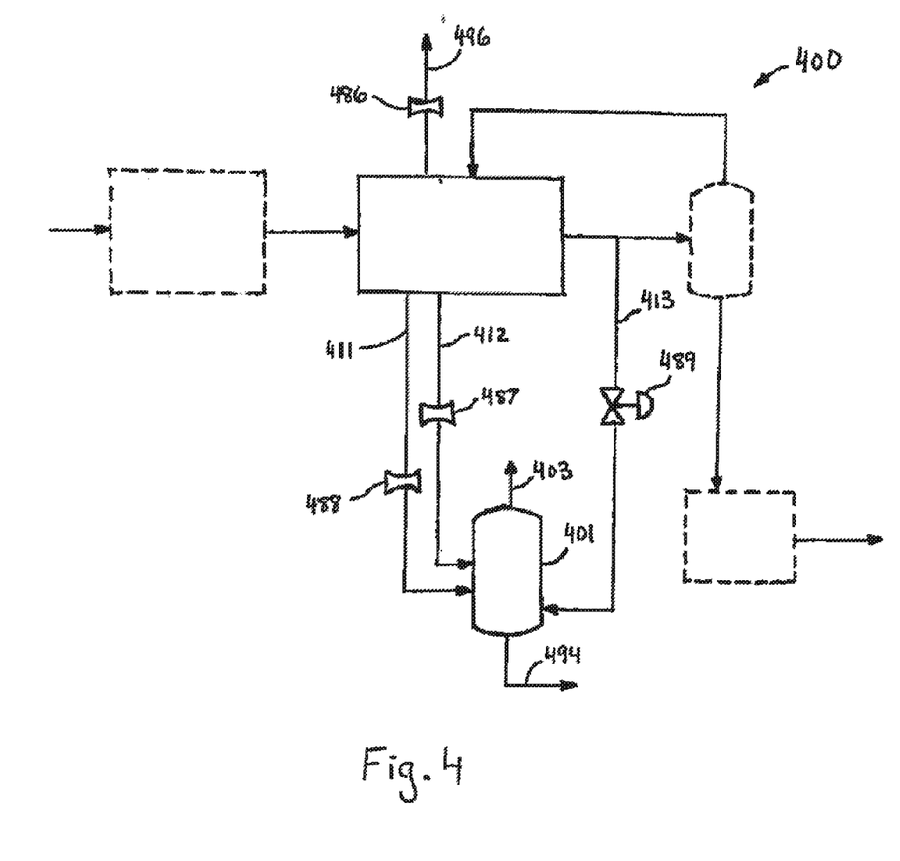
FIG. 4 schematically illustrates a polymerizations system comprising an autoclave reactor and a separation system.

For another example, as shown in FIG. 4, polymerization system 400 includes separation system 401 and reactor 450. Specifically, reactor 450 may be an autoclave reactor. Reactor 450 may have a capacity over 100 kta. The polymerization system 400 may further include any number of additional components to facilitate the polymerization process as disclosed above with regard to polymerization system 300.

Reactor 450 may be let down by opening one or more valves 489 which transfer reaction mixture comprising a mixture of gas and polymer particles in fluid stream 413 to separation system 401. Polymerization system may also include one or more automatic pressure relief devices 486, 487, 488. Pressure relief devices 486, 487, 488 may be any recloseable or non-recloseable devices that allow fluid flow at a predetermined pressure, including, but not limited to, rupture discs, bursting caps and automatic relief valves. One or more pressure relief devices 487, 488 may transfer reaction mixture in fluid streams 411, 412 to separation system 401. Separation system 401 functions as described above with regard to separation system 301, with fluid streams 411 and 413 delivered to separation system 401 through upper and lower fluid inlets, separated fluid 403 released to atmosphere, and residual polymer 494 subsequently removed. When more than two fluid streams 411, 412, 413 are delivered to separation system 401, such as illustrated in FIG. 4, all fluid streams are delivered through fluid inlets at different heights sufficient that the expanding fluid jet from each fluid inlet does not interfere with the others as explained above in reference to FIG. 1C. For example, the vertical distance between fluid inlets may be a distance of at least $1.5*D_I$ in order to avoid jet interaction. Fluid inlets for fluid streams 411, 412, 413 may all be vertically aligned, or may be positioned in any combination of rotation about central vertical axis Z of separation system 401.

Polymerization system 400 may also comprise one or more additional pressure relief devices 486 that release fluid directly to the atmosphere. Pressure relief devices 486, 487, 489 may be set to activate at different pressures. For example, pressure relief devices 487, 488 which let down to separation system 401 may be set at a lower relief pressure than pressure relief device 486 which lets down to the atmosphere. Thus, pressure relief devices 486, 487 and 488 may provide redundant safety systems to depressurize reactor 450. Alternatively, pressure relief devices 487, 488 may be set to activate upon the same triggering event that opens valve 489, thereby allowing simultaneous and expedient let down of reactor 450 through fluid streams 411, 412 and 413.

The invention also relates to a process for shutting down a polymerization system (e.g., emergency shut down due to excess pressure and/or temperature). The process may include letting down polymerization reactor 350 by opening two or more valves 388, 389. The process may also include discharging the reaction mixture from polymerization reactor 350, which may be, for example, a high-pressure polymerization reactor, to separation system 301, wherein separation system 301 includes a vessel with at least two fluid inlets including a first fluid inlet and a second fluid inlet, a fluid outlet, and a reservoir configured to contain a liquid at a variable level. The first fluid inlet is positioned higher in the vessel than the second fluid inlet which is in turn positioned higher in the vessel than the level of liquid. The method may also include discharging a portion of the reaction mixture from a point between an upstream end and a downstream end of the polymerization reactor to the separation system through the first fluid inlet and discharging a portion of the reaction mixture from the downstream end of the polymerization reactor to the separation system through the second fluid inlet. The method may also include discharging a higher mass flux of reaction mixture through the first fluid inlet into the vessel than through the second fluid inlet.

EXAMPLES (SIMULATED)

The advantages of the systems and methods described herein, will now be further illustrated with reference to the following non-limiting Examples.

Example 1

A Computational Fluid Dynamics ("CFD") model was developed to simulate an example separation system under reactor shut-down conditions. The modelled system is 12.08 m³ including a cylindrical vessel with an internal diameter of 2040 mm and a vertical fluid outlet with a diameter of 895.25 mm. The separation system includes two fluid inlets defined in the inner cylindrical surface of the vessel, one fluid inlet directly above the other, configured to direct fluid flow tangentially along the inner surface in a counter clockwise direction. The level of liquid in the vessel is 200 mm below the lower fluid inlet.

The model is based on certain initial boundary conditions for both the input and output of the separation system. For the fluid inlets, initial conditions are modelled using a theoretical inlet reservoir in the shape of a rectangular cuboid. The upstream face of the inlet reservoir is set as the inlet face, at which the initial boundary conditions are set, while the other faces of the reservoir are modelled as slip walls. The boundary conditions represent stagnation conditions upstream of the fluid inlet. Specifically, the initial inlet boundary pressure is set at 2750 bar and the mass flow rate through the fluid inlets is assumed to follow the following function:

$$\dot{m} = 880 e^{-t/\tau}$$

where m is the mass flow rate, t is time (in seconds) and $\tau$ is a time constant of 5.866 seconds. In other words, the initial mass flow rate is 880 kg/s, with each fluid inlet delivering 440 kg/s.

The boundary conditions for the fluid outlet are modelled using a theoretical outlet reservoir. The outlet reservoir represents the atmosphere and is modelled as a very large rectangular cuboid. The faces of the outlet reservoir are set at ambient conditions, but are far enough away from the fluid outlet so as not to influence the flow characteristics.

For computational efficiency, only the gas phase fluid and coolant surface is modelled. The coolant surface is only allowed to move as a solid, non-deformable body due to the swirling fluid shearing on it. The fact that the coolant surface deforms in reality but not in the CFD model leads to an overestimation of pressure, and hence provides a safe estimate. The specific heat ratio of the fluid is 1.24 to model ethylene gas.

Under these conditions, a generally subsonic circular flow developed within the vessel, with a steady flow and expansion jet at the fluid outlet. The separation system experienced localized wall pressures in the order of 4 bars at the fluid outlet, 16 bars at the inner surface of the vessel, and up to 30 bars near the fluid inlets.

Example 2

Example 2 had the same conditions as Example 1 with several exceptions: The fluid inlets were positioned 180 degrees from each other about the central vertical axis of the vessel. The lower fluid inlet was configured to deliver 360 kg/s while the upper fluid inlet was configured to deliver 520 kg/s. The fluid outlet diameter was increased to approximately 1016 mm Under these conditions, a generally subsonic circular flow developed within the vessel, with a steady flow and expansion jet at the fluid outlet. The separation system experienced localized wall pressures in the order of 4 bars at the fluid outlet, 22 bars at the inner surface of the vessel, and up to 40 bars near the fluid inlets.

Example 3 (Comparative)

Example 3 had the same conditions as Example 2 except that the fluid inlets were placed on the same vertical level. Under these conditions, a generally supersonic circular flow developed within the vessel, with an unsteady flow through the fluid outlet. The separation system experienced localized wall pressures in the order of 5 bars at the fluid outlet, 37 bars at the inner surface of the vessel, and up to 50 bars near the fluid inlets.

The embodiments and examples set forth herein are presented to best explain the present invention and its practical application and to thereby enable those skilled in the art to make and use the invention. However, those skilled in the art will recognize that the foregoing description have been presented for the purpose of illustration and example only. The description set forth is not intended to be exhaustive or to limit the invention to the precise form disclosed. Many modifications and variations are possible in light of the above teaching without departing from the spirit and scope of the claims.

What is claimed is:

1. A system for separating particles from a fluid originating from a reactor comprising:
   a reactor having a volume over 3.0 m³ or capacity over 250 kta; and
   a vessel defined about a central vertical axis, the vessel comprising a vessel inner surface, at least two fluid inlets including a first fluid inlet and a second fluid inlet, a fluid outlet, and a reservoir configured to contain a coolant at a variable level;
   wherein the first fluid inlet is positioned higher in the vessel than the second fluid inlet and the second fluid inlet is positioned higher in the vessel than the level of coolant contained in the reservoir.

2. The system of claim 1, wherein the fluid inlets are defined on the vessel inner surface.

3. The system of claim 1, wherein the first fluid inlet is positioned directly above the second fluid inlet.

4. The system of claim 1, wherein the first fluid inlet is positioned about 180 degrees about the central vertical axis from the second fluid inlet.

5. The system of claim 1, wherein the fluid outlet is positioned at the top of the vessel concentric with the central vertical axis.

6. The system of claim 1, wherein the vessel is substantially cylindrical.

7. The system of claim 1, wherein the fluid inlets are configured to introduce fluid into the vessel tangentially to the vessel inner surface.

8. The system of claim 1, wherein the fluid inlets are configured to introduce fluid into the vessel in the same tangential direction about the central vertical axis.

9. The system of claim 1, wherein the fluid inlets have an internal diameter Di, and the difference in height of the first and second fluid inlets is at least 1.5*Di.

10. The system of claim 1, wherein the first fluid inlet is configured to deliver a higher mass flux of fluid to the vessel than the second fluid inlet.

11. A polymerization system comprising:
    a tubular polymerization reactor; and
    a separation system comprising:
    a vessel comprising at least two fluid inlets including a first fluid inlet and a second fluid inlet, a fluid outlet, and a reservoir configured to contain a coolant at a variable level, wherein the first fluid inlet is positioned higher in the vessel than the second fluid inlet and the second fluid inlet is positioned higher in the vessel than the level of coolant contained in the reservoir;

wherein the fluid inlets are connected to the polymerization reactor and each fluid inlet is configured to deliver fluid to the vessel from a different zone of the polymerization reactor.

12. The polymerization system of claim 11, wherein the tubular polymerization reactor has a volume over 3.0 m$^3$ or capacity over 250 kta and is operable at about 120 to about 310 MPa and about 225 to about 375° C.

13. The polymerization system of claim 11, wherein the polymerization reactor comprises zones including an upstream end, a downstream end, and a midstream zone located between the upstream end and downstream end;
wherein the first fluid inlet is configured to deliver fluid to the vessel from the midstream zone and the second fluid inlet is configured to deliver fluid to the vessel from the downstream end.

14. The polymerization system of claim 11, wherein the first fluid inlet is configured to deliver a higher mass flux of fluid to the vessel than the second fluid inlet.

15. A method for separating particles from a reaction mixture during shut-down of a polymerization reactor having a volume over 3.0 m$^3$ or capacity over 250 kta comprising:
letting down the polymerization reactor by opening one or more valves; and
discharging at least a portion of the reaction mixture from the polymerization reactor to a separation system, wherein the separation system comprises:
a vessel comprising at least two fluid inlets including a first fluid inlet and a second fluid inlet, a fluid outlet, and a reservoir configured to contain a coolant at a variable level, wherein the first fluid inlet is positioned higher in the vessel than the second fluid inlet and the second fluid inlet is positioned higher in the vessel than the level of coolant contained in the reservoir.

16. The method of claim 15, wherein the polymerization reactor is a high-pressure polymerization reactor.

17. The method of claim 15, further comprising:
discharging at least a portion of the reaction mixture from a point between an upstream end and a downstream end of the polymerization reactor to the separation system through the first fluid inlet; and
discharging at least a portion of the reaction mixture from the downstream end of the polymerization reactor to the separation system through the second fluid inlet.

18. The method of claim 15, wherein a higher mass flux of reaction mixture is discharged through first fluid inlet into the vessel than through the second fluid inlet.

19. A system for separating particles from a fluid originating from an autoclave reactor comprising:
a vessel defined about a central vertical axis, the vessel comprising a vessel inner surface, at least two fluid inlets including a first fluid inlet and a second fluid inlet, a fluid outlet, and a reservoir configured to contain a coolant at a variable level;
wherein the first fluid inlet is positioned higher in the vessel than the second fluid inlet and the second fluid inlet is positioned higher in the vessel than the level of coolant contained in the reservoir.

20. The system of claim 19, wherein the first fluid inlet is positioned directly above the second fluid inlet.

21. The system of claim 19, wherein the first fluid inlet is positioned about 180 degrees about the central vertical axis from the second fluid inlet.

22. The system of claim 19, wherein the fluid outlet is positioned at the top of the vessel concentric with the central vertical axis.

23. The system of claim 19, wherein the vessel is substantially cylindrical and the fluid inlets are configured to introduce fluid into the vessel tangentially to the vessel inner surface in the same tangential direction about the central vertical axis.

24. The system of claim 19, further comprising a valve and an automatic pressure relief device wherein the valve controls fluid flow through one of the fluid inlets and the automatic pressure relief device controls fluid flow through a different fluid inlet.

25. The system of claim 19, wherein the fluid inlets have an internal diameter Di, and the difference in height of the first and second fluid inlets is at least 1.5*Di.

* * * * *